April 2, 1957    J. A. BRENDLE    2,787,248

DISPENSER FOR PARTICULATE MATERIAL

Filed Feb. 2, 1954

INVENTOR.
JOHN A. BRENDLE
BY
R. G. Story
ATTORNEY

United States Patent Office 2,787,248
Patented Apr. 2, 1957

2,787,248

DISPENSER FOR PARTICULATE MATERIAL

John A. Brendle, Chicago, Ill., assignor to Swift & Company, Chicago, Ill., a corporation of Illinois Application February 2, 1954, Serial No. 407,682

6 Claims. (Cl. 119—52)

The present invention relates to a device for opening a container holding a particulate material and for dispensing that material from the container.

The present invention was devised for use in supplying dry feeds to pets. However, it could be used to supply other particulate material, such as sugar and salt, or the like, which may come packaged in containers.

The principal object of the present invention is to provide a device for permitting pets to feed freely from a dish of food while keeping the majority of the food in the original container where it will be protected against contamination or damage, with only a sufficient quantity being in the feeding dish at any one time to fulfill the immediate needs of the animal. A particular advantage of the invention is the fact that the particulate material need not be removed from the original container and placed in some separate container. This not only eliminates any unnecessary handling, but prevents any damage to the product such as might occur during such separate handling.

A further object of the invention is to provide a structure wherein the original container for the product is only opened after it has been inserted into the feeding device. This serves to protect the product as well as to prevent any spilling or loss of product such as might occur were the original container to be opened prior to inserting into the holder.

Further objects and advantages include: a device which is simple and inexpensive to manufacture, a device which may be readily cleaned, and a device in which all of the particulate material in the original container will readily flow from that container.

Other objects and advantages will become apparent from the following description taken in conjunction with the drawings, in which.

Figure 1:
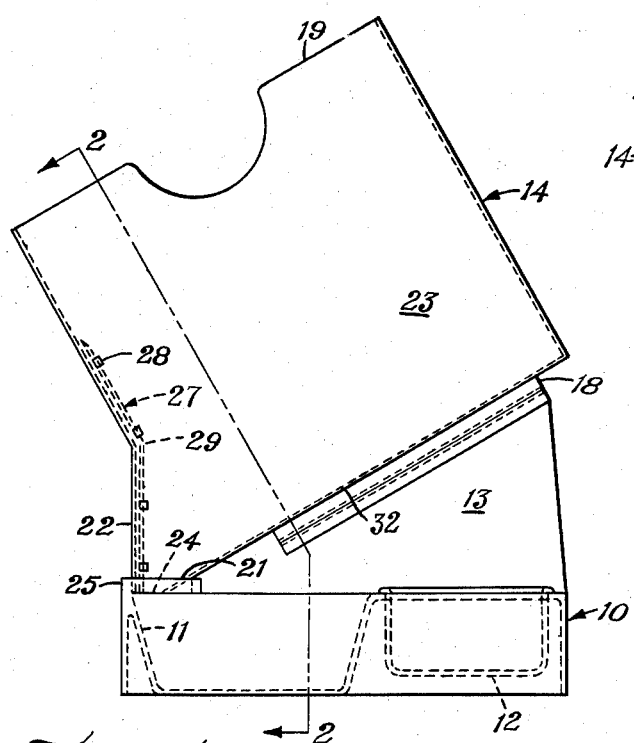
Figure 1 is a side elevation of an embodiment of the invention.

In the embodiment illustrated in Figure 1, a body generally 10 has an inner receptacle 11 for receiving the particulate material. Inasmuch as the embodiment illustrated and described was devised for the feeding of pets, the body 10 also holds a water bowl 12. Adjacent the rear side of the body 10 is an upstanding member 13 to support a box holder generally 14. Attached to upstanding member 13 is a slotted member 16 with the slots forming ways 17. A pair of guides 18 are secured to holder 14 to be received in ways 17 and secure the holder 14 onto the supporting member 13.

Holder 14 is only slightly larger than the box of particulate material, the difference in dimensions being sufficent to allow the box to slide freely in and out of the holder without any appreciable movement of the box sideways with respect to the holder. The holder is closed on five sides, with the upper side 19 being open to permit insertion and removal of the box. The box holder 14 is positioned at an angle with respect to the body, with one closed corner 21 of the holder being down so that the particulate material will flow freely from all portions of the box toward corner 21.

The downwardly extending side 22 of the holder, between corner 21 and the open side 19, is bent outwardly to form an enlarged space about the box when it is in the holder. The adjacent sides 23 are extended to meet the bent portion of side 22 so that this enlarged space is completely enclosed except on the bottom where an opening 24 is provided to allow the particulate material to flow from the box into the receptacle 11. This enlarged space bounded by the bent portion of side 22, the extension of bottom wall 32 and the front and rear sides of holder 14 is shown in the drawings as being funnel-shaped. Certain of the claims refer to this enlarged space as a funnel. However, the term "funnel" is not intended to strictly limit the scope of the invention to a purely funnel-shaped passageway as, clearly, the precise shape of the conduit leading from holder 14 to receptacle 11 through the opening 24 is not material to the proper operation of the device. Any suitably enclosed passageway will serve. It is important only that wall 22 be bent outwardly to provide space for the guide 43. Under most circumstances, this will form a funnel. An upward flange 25 is provided on body 10 about opening 24 to limit the level to which the particulate material will rise in flowing the box into the receptacle 11.

Within holder 14 is a cutter generally 27. The cutter is formed from a flat sheet of metal of a size to extend across the thickness of the holder and has a plurality of projecting ears 28 that extend through slots in the wall of the holder and are then bent over to hold the cutter in place. The cutter is spaced from the inner wall of side 22 a distance slightly greater than the thickness of the cardboard forming the container for the particulate material and is positioned parallel to that inner wall. The cutter is bent along a line 29 to conform to the bend in wall 22. The upper edge of the cutter is formed with two, outside, curvilinear, edges 30 which terminate with two upwardly projecting edges 31 all of which are sharpened to cut the box as it slides down into the holder 14.

The sealed box of particulate material, such as dry dog food, is slipped into the holder through the opening 19. As the downward end of the box strikes the point formed by straight cutting edges 31, the point pierces the end of the box and the cutting edges 31 and 30 cut a tab from the side of the box. As the box is pushed further into the holder this tab slides between the cutter 27 and the inner wall of side 22. When the tab reaches the bend represented by bend 29 in cutter 27 the lower portion of the cutter acts as a tab guide to move the tab away from the box to leave an opening in the box. The box is pushed all the way into the holder so that the bottom of the box rests on the bottom wall 32 of the holder 14.

The particulate material falls through the opening made in the side of the box by the turning back of the tab and through the opening 24 of the holder into the receptacle 11. The bottom of the receptacle 11 immediately below the opening 24 slopes toward the opposite side of the receptacle as seen at 34 so that the particulate material will flow towards the unobstructed side of the receptacle where it can be conveniently reached. As the receptacle 11 becomes full, flange 25 about opening 24 prevents further flow of the particulate material into the receptacle. As the particulate material is removed from receptacle 11 and the level of the material in that receptacle goes down, the receptacle is continually refilled by more particulate material flowing from the box through opening 24.

When the box is empty it may be removed from the holder and a new box substituted. The guides 18 sliding in ways 17 allow the holder to be removed from over the receptacle 11 and the dish 12 to facilitate the cleaning of the device when that is necessary.

Figure 3:
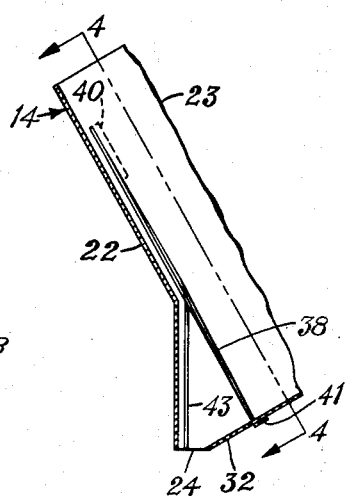
Figure 3 is a section of the container holder showing an alternate form of a cutter for use in the dispenser.
Figure 4:
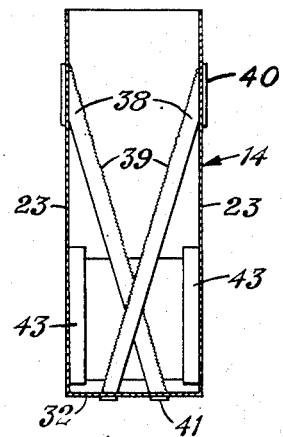
Figure 4 is a section along line 4—4 of Figure 3.

Figures 3 and 4 are sections through a box holder 14 illustrating an alternative cutter structure. In this embodiment instead of puncturing the box in the center and cutting outwardly to the sides of the box, the cutting starts at the side and progressively works to the center. Furthermore, the cutter is separate from the guide structure for moving the tab away from the side of the box after it has been cut. The cutter and guides of the embodiment of Figures 3 and 4 are relatively open. Those two factors prevent jamming which may be caused when dispensing boxes of relatively small particulate material which otherwise may tend to get behind the cutter and guides to prevent the smooth insertion and removal of the boxes.

Figure 2:
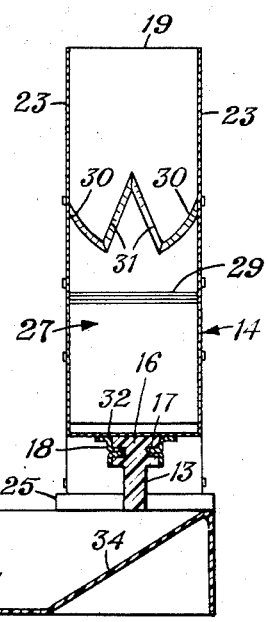
Figure 2 is a section taken at line 2—2 of Figure 1.

In the embodiments of Figures 3 and 4 the cutter takes the form of a pair of flat strips of metal 38 having toothed edges 39. They are positioned in the form of a cross with the toothed edges inwardly. The upper ends of each of the strips 38 project through slots in the side walls 23 with the ends of the strips being bent over to form tabs 40. Similarly the two lower ends of the strips 38 project through slots in the bottom 32 of the holder and the strips are bent over to form tabs 41. The spacing of strips 38 from the inner side of wall 22 is again only slightly greater than the thickness of the material forming the container holding the particulate material to be dispensed, and as seen in Figure 3, the cutters are parallel to the upper end of wall 22. In either case, whether the alternative cutter structure of Figures 3 and 4 or the structure of Figures 1 and 2 is employed, the topmost cutting edge of the blade or blades extends the full width of the side 22 of the holder upon which the box will eventually rest. This insures that the knife will cut a tab or strip comprising the narrow side wall of the box as the latter is inserted into the holder; two substantially parallel cuts being formed, one on either side of the box and a third cut across the top to form a flap of a portion of the narrow side wall of the box. Expressed in another fashion, the essential feature here is that irrespective of which knife embodiment is used in cutting the strip or tab, the narrow side wall of the box is peeled outwardly and a large enough opening is thereby obtained in the box to allow for the passage of material of substantial size.

Attached to the inner faces of sides 23 are a pair of tab guides 43. The upper ends of the guide 43 are just slightly higher than the bend in wall 22 and the guides extend to the bottom of the holder parallel to the lower portion of wall 22.

As the box is slid into the open end of the holder 14 the saw-toothed edges 39 of the cutters commence opening the box at the side edges of the box. The cut progresses inwardly as the box slides into the holder and also progresses up the sides of the box with the tab being completely formed at about the time the box reaches guides 43. The guides then engage the outer edges of the tab to move it outwardly away from the box and thus permit the particulate material to flow from the box as previously described. The slight flexibility that will be present in strips 38 plus the fact that the strip and guides only extend partially across the width of the tab prevent the particulate material from jamming the space between the cutter and the guides and the inner face of wall 22.

The foregoing description of a specific embodiment is for the purpose of compliance with 35 U. S. C. 112, and I do not desire to be limited to the exact details shown and described, for obvious modifications will occur to persons skilled in the art. For example, the shape and proportions of holder 14 will be dependent upon the type of container in which the particulate material to be dispensed is held.

I claim:

1. A dispenser for supplying a particulate material from a box of said material, said dispenser including a base having a material holding receptacle, a five-sided box holder mounted above said receptacle with the open side generally upwardly and with a lower corner thereof immediately over said receptacle, said holder being slightly larger than said box whereby the box may be received therein, said corner being enlarged to provide a space between the holder and the box, and a cutter within said corner and extending upwardly beyond the enlarged portion, said cutter being generally parallel to and spaced from a wall of the holder a distance slightly larger than the thickness of the wall of the box, said enlarged portion having an opening in the bottom thereof for the particulate material to pass, said receptacle including means about said opening extending above the level of the opening.

2. A dispenser for supplying a particulate material from a box of said material, said dispenser including a base having a material holding receptacle, a five-sided box holder mounted above said receptacle with the open side generally upwardly and with a lower corner thereof immediately over said receptacle, said holder being slightly larger than said box whereby the box may be received therein, a given side of said holder between said open side and said corner having a bend therein and being disposed outwardly adjacent said corner to provide a space at said corner with the greatest area of said space being at said corner, the sides of said holder enclosing said space except at a point immediately over said receptacle, a cutter within said holder and parallel to said given side at a point above said bend, and guide means parallel to said side and extending downwardly from said bend, said cutter and said guide means being spaced from said given side a distance slightly larger than the thickness of the wall of the box.

3. A dispenser for a particulate material for use with a receptacle, said dispenser comprising: a holder having at least two walls including a bottom and at least one side; a funnel between said bottom and said side extending outwardly and downwardly therefrom; a cutter having a top cutting edge extending the full width of one of said walls of said holder and positioned along said wall, said cutter serving to cut a strip from the side of a box as said box is inserted into said holder; and a guide extending downwardly and outwardly into said funnel and positioned generally along that portion of said funnel extending from said holder wall to bend said strip of said box outwardly after said cutter has cut said strip, said guide being positioned below said cutter, said guide and said cutter being spaced from the funnel and holder wall respectively at least the thickness of said side of said box.

4. The dispenser of claim 3 wherein the holder is closed on all sides thereof except at the top and at the base portion where said funnel joins said holder.

5. Apparatus comprising: in combination, a receptacle having a base portion, material holding sides and an open top; a dispenser positioned above said receptacle, said dispenser comprising a holder having at least two walls including a bottom and at least one side; a funnel between said side and said bottom extending outwardly and downwardly therefrom toward said receptacle; a cutter along one of said walls of said holder; a guide beneath said cutter and extending downwardly and outwardly into said funnel generally along that portion of said funnel extending from said holder wall, said cutter having a top cutting edge extending the full width of said wall of said holder, said cutter and said guide serving to cut a strip from the side of a box as said box is inserted into said holder and bend said strip outwardly from the side of said box, said guide and said cutter being spaced from the funnel and holder wall respectively at least the thickness of said side of said box.

6. Apparatus of claim 5 wherein said holder comprises: a framework open only at the top thereof and at the point where said funnel joins said holder, said holder being positioned at an angle above said receptacle.

References Cited in the file of this patent

UNITED STATES PATENTS

| | | |
|---|---|---|
| 1,028,542 | Christian | June 4, 1912 |
| 2,036,514 | Wiswell | Apr. 7, 1936 |
| 2,071,944 | Hoffman | Feb. 23, 1937 |
| 2,138,844 | Erb | Dec. 6, 1938 |
| 2,350,836 | Sonneborn et al. | June 6, 1944 |
| 2,571,705 | Goodman et al. | Oct. 16, 1951 |